United States Patent

[11] 3,621,279

[72] Inventors Teh-Sen Jen Fishkill; Wilbur D. Pricer, Poughkeepsie, N.Y.; Norbert G. Vogl, Jr., Essex, Vt.
[21] Appl. No. 6,498
[22] Filed Jan. 28, 1970
[45] Patented Nov. 16, 1971
[73] Assignee International Business Machines Corporation Armonk, N.Y.

[54] HIGH-DENSITY DYNAMIC SHIFT REGISTER
6 Claims, 7 Drawing Figs.

[52] U.S. Cl. .......... 307/221 C, 307/213, 307/279, 307/251
[51] Int. Cl. .......... G11c 19/00
[50] Field of Search .......... 307/221 C, 251, 213, 279

[56] References Cited
UNITED STATES PATENTS

| | | | |
|---|---|---|---|
| 3,322,974 | 5/1967 | Ahrons et al. .......... | 307/221 C |
| 3,506,851 | 4/1970 | Polkinghorn et al. .......... | 307/251 |
| 3,524,077 | 8/1970 | Kaufman .......... | 307/221 C |

OTHER REFERENCES
Application Notes of General Instrument Corp., Dec., 1967, by Sidorsky, pp. 1–5

*Primary Examiner*—Donald D. Forrer
*Assistant Examiner*—John S. Heyman
*Attorneys*—Gerald W. Griffen, Robert S. Dunham, Pern E. Henninger, Lester W. Clark, Thomas F. Moran, Howard J. Churchill, R. Bradlee Boal, Christopher C. Dunham, Robert Scobey and John F. Ohlandt, Jr.

ABSTRACT: A dynamic shift register is disclosed for providing large capacity storage of digital data information in a small-volume solid-state package. A unique high-density approach is taken, involving a cell comprising $n$ subcells capable of storing $n-1$ bits of data. The cells are fabricated preferably of field effect transistors embedded in a semiconductor wafer or monolith.

INVENTORS
TEH-SEN JEN
WILBUR D. PRICER
NORBERT G. VOGL, JR.

BY John F. Ohlandt Jr.

HIGH-DENSITY DYNAMIC SHIFT REGISTER

BACKGROUND OBJECTS AND SUMMARY OF THE INVENTION

This invention relates to a dynamic shift register capable of providing large capacity storage of digital data information, and which is especially adapted for limited volume implementation by solid state technology.

A variety of types and forms of shift registers have been known in the prior art. One example of a shift register implemented by solid-state technology is described in U.S. Pat. No. 3,449,728. In particular, a double rank arrangement is provided for the memory cells, whose operation involves the use of a two-phase voltage pulsing scheme.

A great variety of devices have been utilized over the years in shift register arrangements, the most common of these being magnetic cores and bipolar transistors. Other devices which are commonly employed have utilized capacitors as storage elements, the storage in such cases being of a more transitory or evanescent character than with cores or bipolar transistors. One of the recently developed transitory types of storage devices involves field effect transistors whose charge storage characteristics are relied upon for the storage of data. An example of a signal storage circuit utilizing the charge storage characteristics of field effect transistors can be appreciated by reference to U.S. Pat. No. 3,461,312, assigned to the assignee of the present invention. A low-cost, reasonably high-capacity shift register can be implemented by means of the signal storage circuit described therein. Advantageously, a shift register stage may be constructed with very few components and may be fabricated by integrated circuit techniques. Basically, what the signal storage circuit of the aforesaid Patent does is to utilize the capacitance which exists at a node in the circuit, transferring this charge stored thereat through successive stages.

Notwithstanding the manifest advantages of the shift register types that may be implemented readily by means of the recently developed integrated circuit approaches, there still remains an insistent demand for greater and greater packing density of the memory elements or cells that make up shift registers and like systems. The packing density as referred to throughout the description is expressed as area per bit of data, by which is meant the area of the semiconductor wafer or monolith in which the individual elements are formed.

The present invention is based upon the recognition that many of the parts previously employed in shift registers are not strictly necessary, and therefore are wasteful of wafer space when it comes to their fabrication in solid-state technology. For example, taking a typical memory cell arranged conventionally for two-phase operation, each cell consists of two identical subcells, each attached to a distinct clock phase and with the necessary requirement that two clock phases are necessary to shift the data from the input of the complete cell to the output thereof. Therefore, a shift register of this kind, which has one part holding the data while the other part first erases and then receives the new data, requires two half-cells to store one bit of information. The present invention recognizes that the essential operating principle of shift registers does not really require two subcells of the aforesaid type, and that one subcell should be enough. This is because only the data being currently shifted at any time needs two subcells.

Accordingly, the underlying principle of the present invention resides in the design and construction of a shift register such that all the data need occupy only one subcell per bit except the bit being currently shifted. As an example of this, which constitutes a preferred form or embodiment, a four-subcell shift register will store three bits of data. In other words, three subcells are utilized fully for storing data, while the remaining subcell operates to shift the data from one cell to the next.

It is therefore a primary object of the present invention to provide a shift register in which the memory cell is so designed that the required subcells which constitute the memory cell are reduced to a minimum in respect of the storage of data. Thus, a minimum number of transistors or like devices are required for the storage of a single bit of information.

Another object of the present invention is to enable optimum packing density (denser chip layout) in fabricating memory elements that will serve to implement shift registers.

A primary feature of the present invention resides in the arrangement of the required subcells to form a multiphased shift register and in which each cell is constituted of $n$ subcells which store $n$-1 bits of data. In accordance with such an arrangement, a new bit of data appears on the output of each complete cell for every $n$ phase of the clock. It should be noted that reference to the term "clock" is convenient usage and denotes the employment of well-known pulse-generating devices.

A more specific feature of the present invention resides in the fact that the clock operation is in the conventional time sequence of phases, but these phases are physically connected to the cell in reverse order of the conventional connection. As will also become apparent, the loading on each phase driver is equal to the number data bits divided by $n-1$.

Pursuant to the major objects of the present invention and in accord with the fundamental recognition of the aforenoted judicious rearrangement of a multiphased shift register, it is a specific object of the present invention to optimize the saving of wafter area that is inherent in such rearrangement. In other words, the wafer area saving approaches the ideal percentage because of the specific features of the present invention relating to layout of the chip or wafer. Ideally, this rearrangement principle should yield $(n-2)/(2n-2)\times 100\%$. In practice, however, the wafer area saving is always less than the ideal percentage because of the extra area taken up by additional clock lines and interconnections. The net saving becomes strongly dependent on the basic subcell configuration. The particular configuration will be discussed in detail hereinafter. Suffice it to say here that such a subcell comprises a plurality of field effect transistors uniquely coupled and relying on inherent as well as purposely introduced capacitance to provide the operation that will achieve the previously mentioned optimization in usage of wafer space.

DESCRIPTION OF THE PREFERRED EMBODIMENTS

Figure 1:
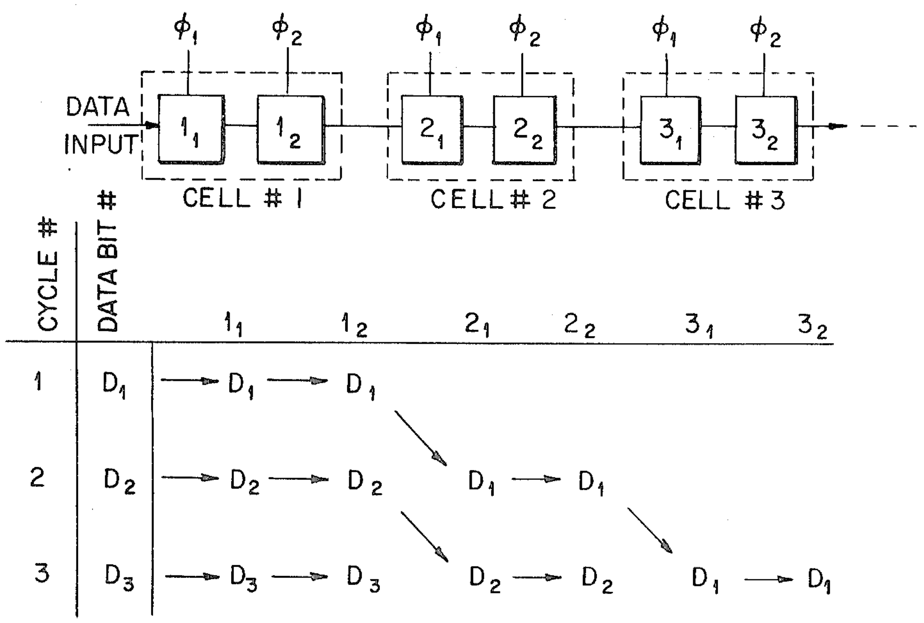
FIG. 1 PRIOR ART
FIG. 1 is a schematic diagram of a prior art, two-phase dynamic shift register; and an accompanying table which indicates the data flow in relation to the clock cycles.

Referring now particularly to FIG. 1 in the drawing, there is depicted, by means of a block diagram, a two-phase dynamic shift register known in the prior art. Such a register may take many forms, but as one example, a two-phase shift register comprising six field effect transistors (FET's) is shown. Two of the transistors are used as transmission gates between the principal stages which consist of inverters. According to such a dynamic system the various devices, i.e., both the transmission gates and the inverter stages are controlled by means of clock pulses in two phases. Typically, the transmission gates are so controlled that, upon termination of a predetermined clock pulse, the transmission gate is turned OFF and the gate capacitance of one of the filed effect transistors of the next succeeding inverter is conditioned to turn its associated field effect transistor ON or OFF, depending upon the initially applied input. When the succeeding inverter is pulsed, an associated transmission gate connected to the next register stage is energized, and, depending upon the condition of the gate capacitance of the succeeding inverter, the first inverter of the next stage is turned ON or OFF, and this action is propagated through all the inverters in the several shift register stages.

Ignoring the specific forms that known two-phase dynamic shift registers may take, it will be appreciated by reference to FIG. 1 that the storage capacity of the shift register therein depicted is one bit per cell, each cell being constituted of two half-cells. Thus, cell No. 1 is made up of half-cell $1_1$ and another half-cell $1_2$. Two distinct clock phases are respectively connected to the half-cells such that during one cycle $0_1$ is applied to the half-cell $1_1$, and $0_2$ to the half-cell $1_2$. Similarly, the other cells are connected for such two-phase operation.

The table illustrating data flow versus clock cycles indicates the movement of data bits through the prior art type of shift register. The first column of the table lists the three cycles, each of which includes the application of the two-phase clock pulses ($0_1$ and $0_2$). Looking at the third and fourth column of the table it will be understood that the data bit designated $D_1$ is stored in cell No. 1 in both of the half-cells upon completion of the first cycle, that is after completion of a cycle including application of both the $0_1$ clock pulse and the $0_2$ clock pulse. On the next cycle the data bit designated $D_2$ appears in cell 1 but the data bit $D_1$ has been shifted into cell No. 2. In the same manner, after the third cycle is completed the data bit $D_3$ appears in cell No. 1, whereas $D_2$ is now present in cell 2 and $D_1$ has been shifted down to cell No. 3.

Figure 2:
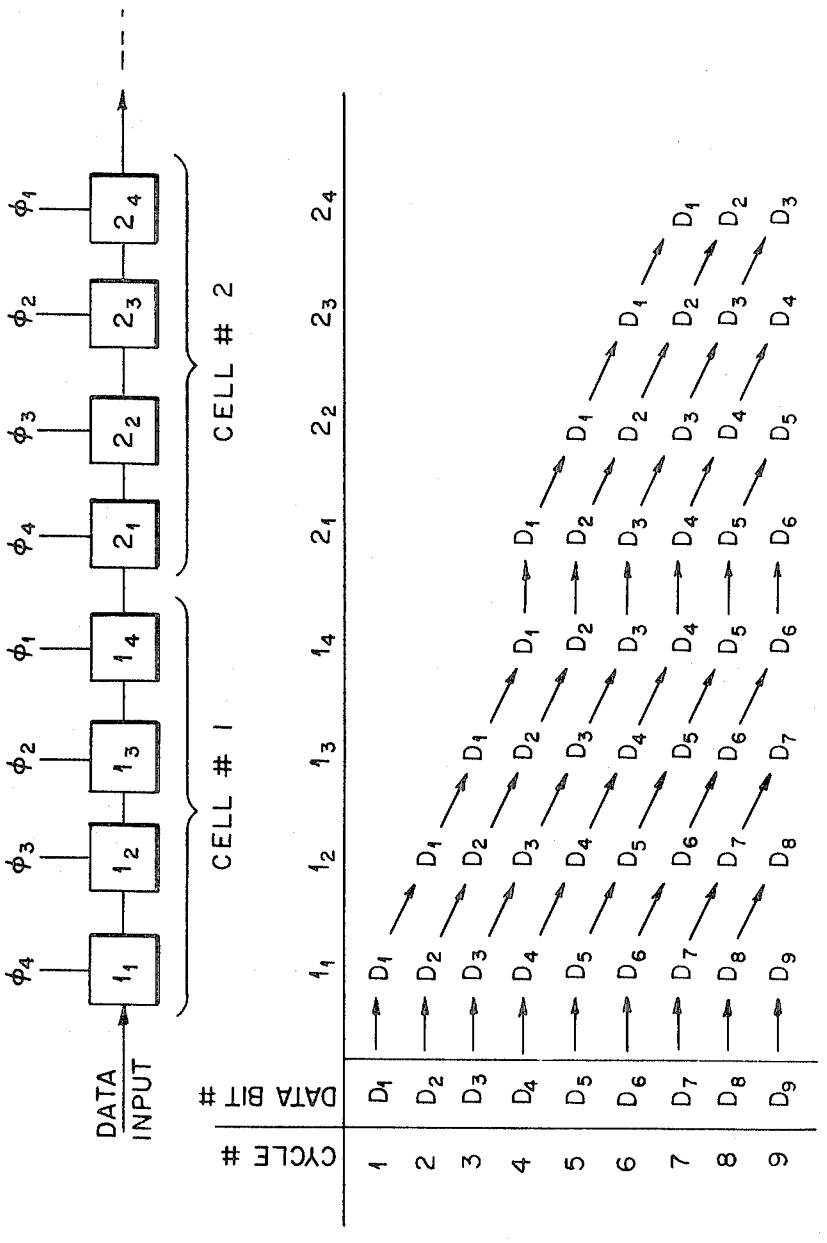
FIG. 2 is a schematic diagram depicting an embodiment, in accordance with the present invention, of two stages of a high-density four-phase dynamic shift register; and an accompanying table of data flow in relation to clock cycles for the sake of comparison with FIG. 1.

Referring now to FIG. 2 the entirely different approach taken in accordance with the present invention in rearranging a dynamic shift register will be appreciated. In this figure two stages or two complete cells of a high-density four-phase system is shown. For reasons which will become apparent the clock phases are physically connected to the individual subcells in the register stages in inverse order to that normally utilized in the prior art. The data input is provided on the left, just as was previously shown in FIG. 1. However, each complete cell consists of four subcells and each subcell is connected to a distinct phase of a four-phase clock-pulsing scheme.

It should be especially noted that in accordance with the system of the present invention each complete cell is capable of storing three bits. Compared to the prior art, the number of subcells in each complete cell has indeed been doubled because of the fact that the number of clock phases has been doubled. However, the saving in components is manifest. Another way of saying this is that each subcell can now store three-fourths of a bit as compared with a half bit for the same subcell in the prior art.

Referring specifically to the data versus clock cycle diagram, it will be understood that each cycle consists of four phases ($0_1$, $0_2$, $0_3$ and $0_4$) and that as before, the data flow is such that data is initially applied to the input of the first subcell, that is, to the cell designated $1_1$ in FIG. 2. During this first cycle, application of clock phase $0_1$ affects only cell $1_4$, so that it is not until clock phase $0_4$ is applied that cell $1_1$ becomes conditioned to receive the data input in the form of the first data bit designated $D_1$.

When the second cycle beings and the gamut is run of phases $0_1$ through $0_4$, the data bit $D_1$ will be advanced into the next subcell, which is $1_2$, and the new incoming data bit $D_2$ will be entered in subcell $1_1$. The next succeeding cycles similarly advance the data such that after the fourth cycle the situation depicted in the table exists whereby data bit $D_4$ has been entered into subcell $1_1$, $D_3$ is in cell $1_2$, $D_2$ in cell $1_3$ and $D_1$ in cell $1_4$. Also at this time it will be noted that $D_1$ is also stored in the first subcell of cell No. 2, that is in subcell $2_1$. This is a consequence of the application of the $0_4$ pulse to the subcell $2_1$, at the same time that $0_4$ is applied to subcell $1_1$.

Of course, the necessity for such redundancy of bit storage is well known to those skilled in the art, it being necessary to remove data before entering new data. Otherwise the old data would be destroyed.

From the foregoing description, it will now be apparent that the concept of a dynamic shift register having distinct clock phases applied inversely to the direction of data flow, enables extremely efficient data storage. In general, then, $n$ clock phases so applied result in storage of $n$-1 data bits.

Consideration will now be given to the implementation of the unique dynamic shift register of the present invention by individual subcells capable of storing data. It will be appreciated that a variety of types of subcells can be selected. However, it has been found that a particular subcell, uniquely designed for this purpose, is eminently preferable.

Figure 3:
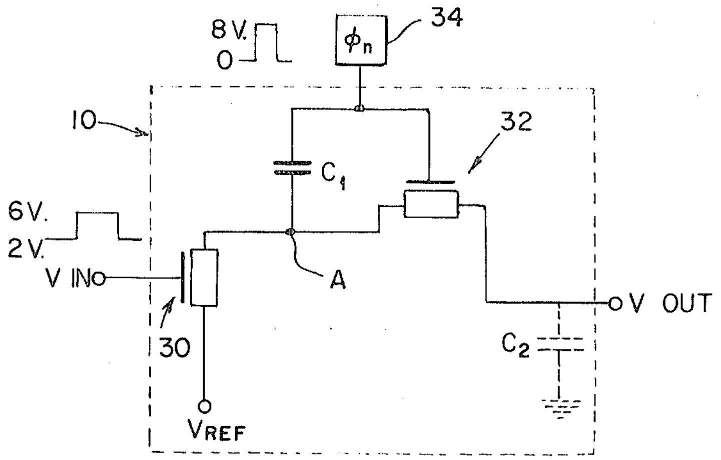
FIG. 3 is a schematic diagram of a preferred embodiment of a basic subcell for use in the shift register of the present invention.

Referring now to FIG. 3, a preferred embodiment of the unique subcell in accordance with the present invention is herein illustrated. The subcell 10 comprises, for example, $n$ polarity field effect transistors (FET's), it being understood, of course, that the opposite polarity type, or P-channel type, could be employed as well. A pair of such FET's as illustrated is utilized and the input voltage representative of data information is applied as an input to the gate of the first FET designated 30. The source electrode of the FET 30 is connected to reference potential ($V_{ref}$), which is selected to be approximately 2 volts The drain electrode of FET 30 is serially connected by way of the node A to the source electrode of FET 32. The clock phase source 34 providing $0_n$ is connected to the gate electrode FET 32 and also to one side of the capacitor $C_1$ which is purposely introduced into the circuit. The other side of capacitor $C_1$ is connected to node A. The other capacitor, that is capacitor $C_2$, represents the inherent or parasitic capacitance to ground at the output which is designated $V_{OUT}$. Certain parasitic capacitors that do exist in the circuit can be ignored for present purposes. Now assuming that a bit of information appears at the input of the circuit of FIG. 3, such bit is in the form of a pulse, according to which voltage $V_{IN}$ rises to an UP level, typically 6 volts, the normal DOWN level being 2 volts. This voltage level is substantially greater than the FET threshold voltage ($V_{th}$) required to initiate conduction. Application of such voltage at the gate of FET 30 turns this transistor ON so that node A, because of the presence of capacitor $C_1$, is charged to the voltage of $V_{ref}$. Thereafter, when the clock phase source $0_n$ is energized to apply a pulse to the gate of FET 32, that transistor is turned ON. $C_2$ is thereupon charged to $V_{ref}$ because a complete path for this purpose then exists. It should be noted that the pulse applied to the gate of FET 32 for turning such transistor ON has an UP level of approximately 8 volts and that this pulse rises at a time subsequent to the rise of the voltage level of $V_{IN}$. Moreover, this pulse terminates before the termination of pulse at $V_{IN}$. When the pulse level of clock phase $0_n$ does return to ground FET 32 is the reupon turned OFF. There being no discharge path for $C_2$, the voltage level at $V_{OUT}$ remains at $V_{ref}$, which has a value of 2 volts. Thus, information which was supplied to the input of the basic subcell 10 shown in FIG. 3 has now been transferred to the output.

Let it be now assumed that the input $V_{IN}$ has returned to its DOWN level, which, typically, is selected to the same as the $V_{ref}$ level (2 volts). As a consequence, FET 30 turns OFF. The next application of clock phase $o_n$ produces charging of $C_1$ with the result that the level of node A rises to nearly the level of clock phase $o_n$. At the same time, FET 32 is turned ON and the eventual result is that the initial charge is redistributed, because of the presence of $C_2$ at the output. Accordingly, node A and $V_{out}$ assume a voltage level of approximately 6 volts. However, when clock phase $o_n$ returns to the DOWN level, which is ground, node A will then become negative with respect to $V_{IN}$, and therefore, backward conduction will occur through FET 30, resulting in node A assuming a voltage equal to $V_{ref}-V_{th}$. In addition to the effect on node A, the return of clock phase $0_n$ to the DOWN level turns off FET 32, thereby leaving $V_{OUT}$ at the 6 volt level it has assumed.

In order to insure complete reliability in the transfer of information on writing of information into subcell, it is necessary that the output FET device 32, FIG. 3, be turned OFF when the clock pulse returns to its DOWN level. Otherwise, charge transferred to parasitic capacitance $C_2$ is able to leak off by virtue of current flowing back through the FET device 32 towards node A. When the clock pulse returns to a DOWN level and the input information at input terminal $V_{IN}$ is at UP level, illustrated as 8 volts, no "Race" condition exists as to the conduction states of the FET devices 30 and 32. That is, at the instant when the clock pulse is switched to its DOWN level, the FET device 30 is clearly turned ON by virtue of the UP or 6 volt signal being applied to its gate. With the FET device 30 in an ON condition, the voltage at node A tends to remain constant or at a value of approximately 2 volts as determined by the $V_{ref}$ source. Under these voltage conditions, device 32 is maintained well below its threshold voltage and is therefore nonconducting. Thus, a discharge path from $C_2$ towards node A is eliminated and the desired condition of device 32 being turned OFF subsequent to a transfer of information to $C_2$ is achieved.

In contradistinction, when a DOWN level data information is being written into the subcell, care must be taken to avoid a "Race" condition as to the conductive states of devices 30 and 32, as the clock pulse goes from an UP to a DOWN state. Significantly, when an UP information signal is applied to $V_{IN}$, a DC path exists from $V_{ref}$ through device 30 and 32 directly to $C_2$. As a result, the voltage at node A remains essentially constant during a write operation of an UP level of data information, even when the clock pulse goes to a DOWN state. However, when the data information $V_{IN}$ is being written in its DOWN level, illustrated at 2 volts, device 30 is OFF and the voltage previously stored in capacitor $C_1$ essentially determines the charge of voltage which is transferred to the parasitic storage capacitor $C_2$, as device 32 is turned ON by a a clock pulse UP level. Thus, when the input information is at a DOWN level, node A tends to go negative when the clock pulse is returned to a DOWN state. With the illustrated voltages and due to capacitor action, node A tends to go to a level of $-2$ volts because one plate of the capacitor tends to assume the voltage level of the other plate at the instant when voltage is removed from it, i.e., going from 8 to 0 volts. If the DOWN level value of the input voltage applied to the gate FET 30 were set to 0 volts, for example, it is possible that devices 30 and 32 would conduct at the time when the clock pulse goes to the DOWN or 0 level and thus provides a discharge path for $C_2$. However, with the DOWN level of the input information and the $V_{ref}$ voltage being maintained at a value intermediate between the two levels of the clock phases, the "Race" condition is positively eliminated. For example, with node A going negative at $-2$ volts and the gate of device 32 at 0 volts, device 32 is maintained below its threshold value and therefore is nonconductive so as to block any discharge path from $C_2$. Similarly, the gate of device 30 is still at a DOWN level of +2 volts and therefore a threshold voltage of 4 volts exists between its gate and node A. This voltage positively exceeds the threshold of device 30 and thus insures that device 30 conducts so as to replenish any charge dissipated from capacitor $C_1$ subsequent to the WRITE operation of a DOWN level signal to terminal $V_{IN}$.

Figures 4A, 4B:
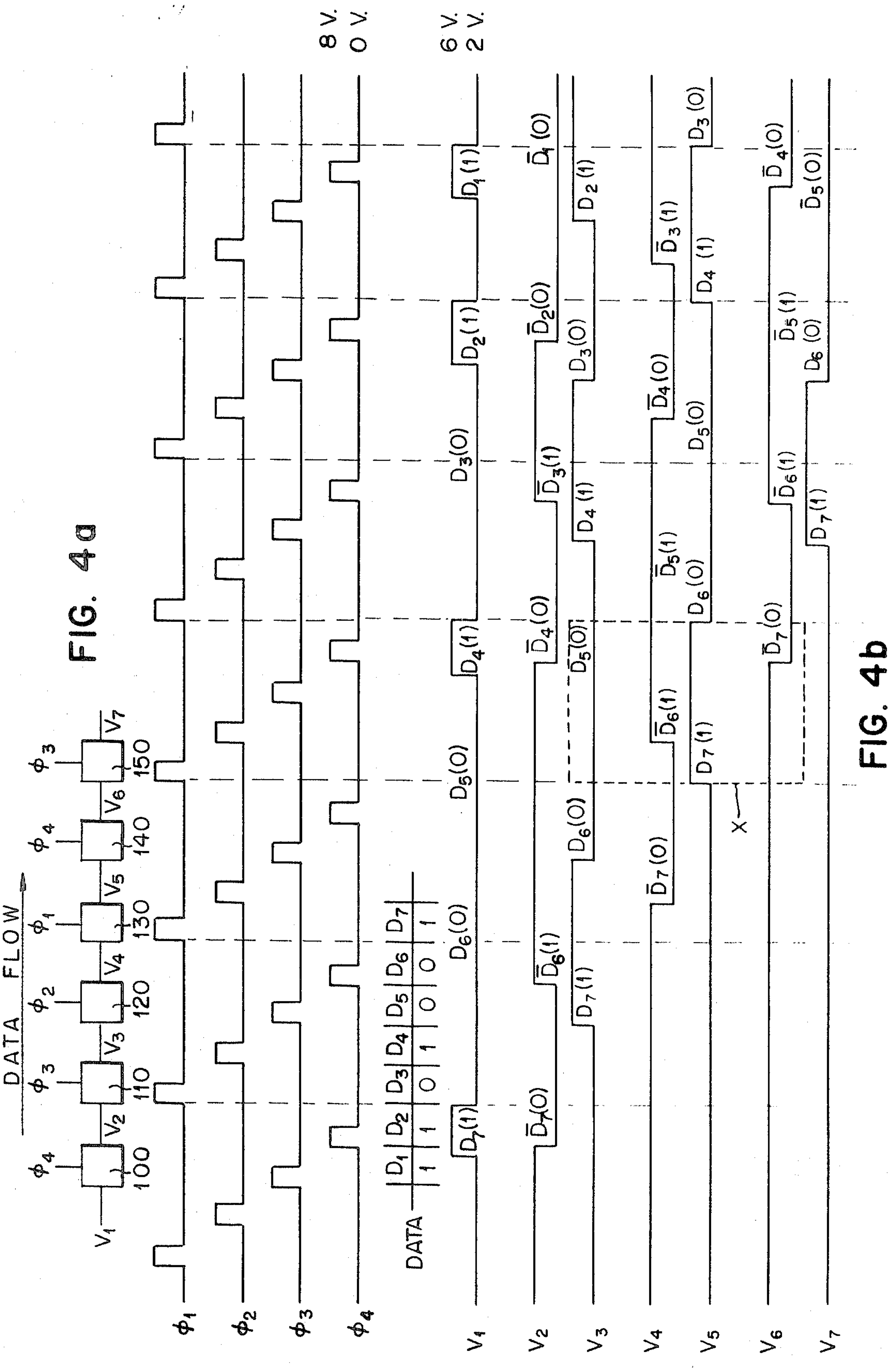
FIG. 4*a* is a schematic diagram depicting six subcells in the shift register of the present invention and particularly illustrating the voltage nodes at the inputs and outputs of the subcells.
FIG. 4*b* is a pulse diagram illustrating the particular pulse shapes for the four-phase clock system, and illustrating the particular voltage levels for the voltage nodes at the inputs and outputs of the subcells.

Referring now to FIG. 4A, there are depicted a group of subcells in a shift register. Each of the subcells 100, 110, 120, 130, 140 and 150 is identical to the subcell 10 shown in FIG. 3 and already described. Although six subcells have been selected for illustration in FIG. 4A, it will be understood that the four subcells 100, 110, 120, and 130 constitute a single complete cell and correspond for example, to cell No. 1 shown in FIG. 2. All of the subcells in the shift register are similarly grouped together, i.e., in groups of four, each subcell in such group being physically connected to a distinct clock phase of the four-phase clock pulse generating system. It will be especially noted that the phases are connected in inverse order to the progression of the data from one subcell to another, such progression being indicated by the arrow denoted DATA FLOW. Thus, clock phase $0_4$ is connected to subcells 100 and 140 and phases $0_2$ and $0_1$ are connected respectively to subcells 120 and 130.

It will be appreciated that, since the output from a given subcell represents the input to the next subcell, the designations $V_2$, $V_3$, $V_4$, $V_5$, $V_6$ and $V_7$ in FIG. 4A indicate both $V_{IN}$ and $V_{OUT}$, as these were used in connection with FIG. 3, while $V_1$ is the input to the first subcell.

Now, referring to FIG. 4B, the pulse shapes for the four clock phases and the pulse shapes for $V_1$, $V_2$, $V_3$, $V_4$, $V_5$, $V_6$ and $V_7$ are depicted. It will be noted in FIG. 4B that a data sequence 1101001 is assumed involving seven bits and, therefore, seven clock cycles. The value for each of the bits $D_1$–$D_7$ is shown in the DATA table.

Referring to the top of FIG. 4B, there will be seen the sequence of clock phases $ø_1$, $ø_2$, $0_3$, and $0_4$. It will be apparent, by reference to the physical connection of these distinct phases to the respective subcells 100, 110, 120, 130, 140 and 150 that, in the first instance, i.e., assuming the beginning of the entering of data into the shift register, none of the subcells will be affected. However, when clock phase $0_4$ is energized, subcell 100 is capable of accepting data. The voltage level for $V_1$, the input to the first stage, rises at a time prior to the rise of the clock phase $ø_4$, to a value of $6_v$, as shown, which represents a "1." As will be seen, the $6_v$ level for $V_1$ persists for a time period greater than that for the UP level ($8_v$) of the clock phase $0_4$.

The output voltage, which is $V_2$ for the particular subcell 100, drops to a level of 2 volts and remains at this level. Voltage $V_2$ represents the input to the next subcell, i.e., subcell 110. It will thus be understood that a data bit has been transferred from the input to the output of subcell 100 and is ready to be transferred through subcell 110 to the next stage.

Transfer through subcell 110 takes place when clock phase $ø_3$ rises to its UP level of 8 volts and causes $V_3$ to change to its UP level of 6 volts.

Similarly, transfer is effected trough the remaining subcells 120, 130, 140 and 150 by the repetitive application of clock phases $0_1$–$0_4$ over the seven cycles illustrated. The pulse shapes for $V_1$–$V_7$ have been labeled with the particular data bit designation so that the progress of the bits through the subcells can be readily followed. It will be seen that the individual bits are designated $D_1$–$D_7$, in a similar designation to the showing in FIG. 2. The bar symbol is used, for example $\overline{D}_7$ (o), to indicate that at a particular stage, the complement is present. For example, in the first cycle of the clock, when clock phase $0_4$ is reached, the voltage $V_2$ at the output of subcell 100 changes to the DOWN level of two volts because $V_1$ is at its UP level of 6 volts, representing a "1" at the input.

In order to demonstrate the effectiveness of the shift register of the present invention in respect of its storage capability, reference is now made in FIG. 4*b* to the time slot shown by means of dotted lines which form a box labeled X. At this particular clock cycle, three different bits are being stored as determined by the voltage levels at $V_3$, $V_4$ and $V_5$. The voltage level at node $V_3$ represents the fifth bit or $D_5$, which has a digital value of "0"; whereas node $V_4$ is storing $D_6$, which has a value of "0" [in this particular case, however, the storage is in complementary form, i.e., $\overline{D}_6$(1) ]; at the same time, node $V_5$ is storing the seventh bit or $D_7$, which has a value of "1."

At the same time that the three bits are being stored as indicated the seventh bit or $D_7$ is also redundantly stored at $v_6$. As will have become clear, such redundancy is necessary in order not to destroy the data bit.

Figure 5A:
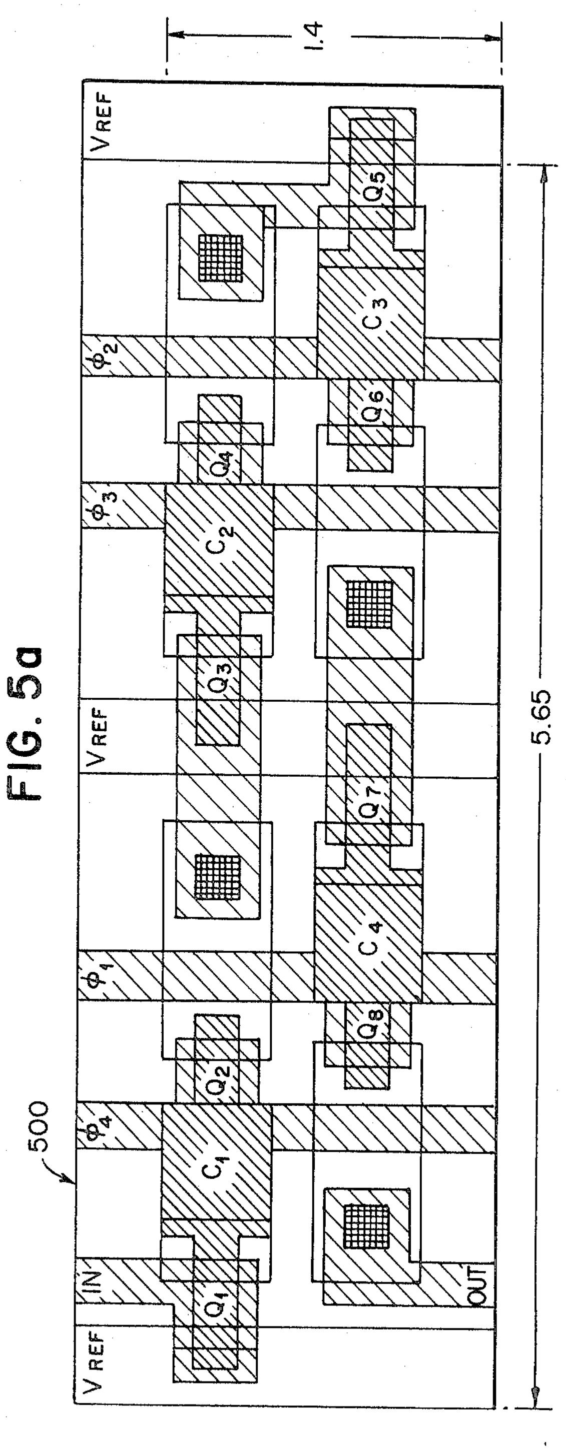
FIG. 5*a* is an integrated circuit layout of a typical memory cell comprising four subcells.
Figure 5B:
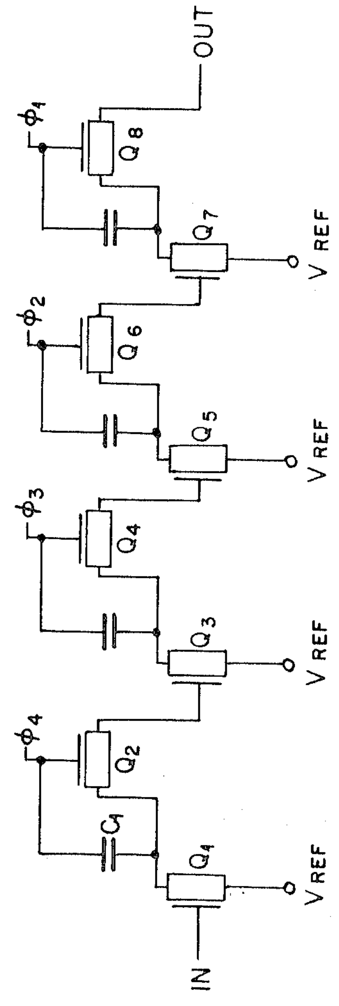
FIG. 5*b* is a schematic diagram of the memory cell shown in FIG. 5*a*.

Referring now to FIG. 5*a*, a complete cell in accordance with tee present invention is illustrated as laid out within a portion of a semiconductor chip or wafer 500. The schematic diagram corresponding to the integrated circuit layout is shown in FIG. *5b* and, as already described, each of the subcells therein consists of a suitably connected pair of FET's. In the schematic of FIG. *5b*, the individual subcells consist of the pairs of transistors $Q_1$ and $Q_2$, $Q_3$, and $Q_4$, $Q_5$ and $Q_6$, $Q_7$ and $Q_8$, respectively. The individual capacitors which are shunt-connected from the source to gate of one of the FET's of each pair are designated $C_1$, $C_2$, $C_3$ and $C_4$ respectively.

It should be especially noted that the particular integrated circuit layout shown in FIG. *5a* is merely exemplary and that other different layouts can be provided. Also, it will be appreciated that the clock phase $0_1$, $0_2$, $0_3$, and 04 are connected to the desired FET gates by suitable metallization and that the required $V_{ref}$ lines are realized by suitable embedded regions within the wafer in accordance with techniques known in the art.

The important point to be noticed in connection with the integrated circuit layout of FIG. $5_a$ is that the complete cell, consisting of the four individual subcells, is achieved within a very small area and enables, as already emphasized, the storage of three bits of information. In accordance with the dimensions indicated on FIG. *5a*, the total area required per bit of information is equal to 5.65×(1.4/3), or 2.64 sq. mils per bit. This area is significantly smaller than the areas required heretofore in fabricating shift registers and like devices.

Another way of looking at the considerable saving in wafer space provided by the present invention is to note that the complete cell as shown in FIG. *5a* requires a total of 8 FET's and the total storage capacity is three bits; therefore, only 2.67 FET's are required per bit.

It should also be noted that the total capacitance load distributed across all phases of the clock is less than the capacitance load for other shift register cells that have previously been devised.

What is claimed is:

1. a shift register for storing digital bits of data comprising:

a. at least one group of interconnected gated registers or subcells for storing $n-1$ bits of data, each of said gated registers or subcells including storage means, and input and output terminal means, b. the total number of gated registers or subcells being less than $2(n-1)$, c. less than $2(n-1)$ control terminals being associated with the less than $2Cn-1)$ gated registers, d. each of said less than $2(n-1)$ control terminals being adapted to receive an individual set of clock signals, the total number of distinct sets of clock signals being greater than two for transferring digital information between said gated registers or subcells, and wherein each individual ones of said greater than two sets of clock signals is effective, in conjunction with a digital bit of data being applied to an input terminal means, to store a digital bit of data in its associated gated register and provide an output signal level representative of the digital bit at its respective output terminal means.

2. A shift register for storing digital bits of information as in claim 1:

a. wherein the total number of gated registers or subcells of said at least one group is $n$, and b. the number of said control terminal being $n$, each one of said $n$ control terminals being adapted to receive one of $n$ distinct sets of clock signals.

3. A shift register as in claim 2 wherein the shift register is comprised of said sole group of interconnected gated registers or subcells.

4. A shift register as in claim 2 wherein the shift register is comprised of a plurality of groups of interconnected gated registers or subcells, each group being identical to said at least one group of interconnected gated registers or subcells.

5. A shift register for storing digital bits of information as in claim 2 wherein said gated registers or subcells of said at least one group comprise a semiconductor monolithic structure.

6. A shift register for storing bits of information as in claim 5 wherein said gated registers or subcells comprise field effect transistors, and said storage means comprise a parasitic capacitor.

* * * * *